UNITED STATES PATENT OFFICE 2,415,021

SUBSTITUTED 5-AMINO-1,3-DIOXANES

Glen H. Morey, Terre Haute, Ind., assignor to Commercial Solvents Corporation, Terre Haute, Ind., a corporation of Maryland No Drawing. Application July 27, 1944, Serial No. 546,937

3 Claims. (Cl. 260—338)

My invention relates to new and useful cyclic acetals. More particularly, it is concerned with new substituted 5-amino-1,3-dioxanes, having the following general structure:

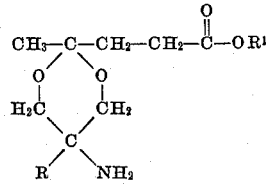

in which R represents either hydrogen or alkyl and $R^1$ is alkyl.

The substituted 5-amino-1,3-dioxanes of my invention may be prepared by the catalytic hydrogenation of the corresponding nitro derivatives. According to such a procedure, the corresponding nitro compound is subjected to hydrogenation at normal or elevated pressures in the presence of a nickel catalyst in the liquid phase with or without an auxiliary solvent at a temperature of around 125° C. or below. In general, any hydrogenation catalyst which possesses catalytic activity under the temperature conditions employed is satisfactory. I desire, however, to employ Raney nickel, a catalyst whose general physical structure and method of preparation are well known. Such a catalyst is active at temperatures as low as approximately 25° C. and has an exceptionally long life.

The hydrogenation reaction in general may be effected at hydrogen pressures ranging from atmospheric pressures to pressures slightly below those which tend to cleave the acetal linkage. I have found it preferable, however, to carry out such reactions at pressures varying between about 1,000 to 2,000 lbs. per sq. inch and at temperatures of about 25° C., while thoroughly agitating the mixture being reduced. In general, it will be found that the rate of reaction is directly proportional to the temperatures and pressures utilized, and therefore, if a lower pressure is desired, a corresponding higher temperature must be employed. When carrying out the reaction in accordance with the preferred conditions described above, the hydrogenation is in general found to be complete after a period of from one to two hours. Optimum conditions, in regard to the temperature, pressure, and catalyst in any given instance, however, may be readily determined by simple experiment.

After the reaction is complete, as may be evidenced by the failure of additional hydrogen absorption, the catalyst is separated from the reaction mixture by filtration and the solvent, if employed, is distilled off. The substituted 5-amino-1,3-dioxane obtained in this manner is in general a relatively pure product. However, if it is desired to purify it further, if a solid at ordinary temperatures, it may be recrystallized readily from the common organic solvents, such as, acetone, ether, benzene, and the like. The products which are normally liquids may be further purified by distillation at reduced pressures.

The substituted 5-nitro-1,3-dioxanes employed in the preparation of the compounds of the present invention are produced in accordance with the procedure described and claimed in my copending application U. S. Serial No. 547,283, filed July 29, 1944. By the procedure there described, a suitable 2-nitro-1,3-propanediol is mixed with an alkyl levulinate in the presence of an acid catalyst and preferably a water-immiscible liquid such as benzene. This mixture is then heated to reflux temperature and the water of reaction removed with the benzene. When the removal of water appears to be substantially complete, the substituted 5-nitro-1,3-dioxanes can be obtained in a substantially pure state by fractionally distilling the crude reaction mixture.

As examples of the substituted 5-amino-1,3-dioxanes covered by my invention, there may be mentioned 2-(2'-carbobutoxyethyl) - 5-amino-5-ethyl-2-methyl-1,3-dioxane, 2-(2'-carbethoxyethyl) - 5 - amino-5-ethyl-2-methyl-1,3-dioxane, 2-(2'-carbobutoxyethyl) - 5 - amino-2-methyl - 1,3-dioxane, 2-(2'-carbohexoxyethyl) - 5 - amino - 5-ethyl-2-methyl-1,3-dioxane, 2-(2'-carbopropoxyethyl) -5-amino-5-ethyl-2-methyl-1,3-dioxane, 2-(2' - carbopropoxyethyl) -5-amino-2,5-dimethyl-1,3-dioxane, and the like.

My invention may be more specifically illustrated by the following specific examples:

Example I 110 parts of 2-(2'-carbobutoxyethyl)-5-nitro-5-ethyl-2-methyl-1,3-dioxane, 600 parts of methanol, and 5 parts of Raney nickel were placed in a suitable hydrogenation apparatus and sealed. This mixture was then subjected to hydrogenation at a pressure of about 2,000 lbs. per sq. in. at 25° C. for a period of one hour with constant agitation. After absorption of hydrogen had ceased, the reaction mixture was withdrawn from the hydrogenation apparatus, the catalyst removed from the solution by filtration and the methanol separated from the reaction mixture by means of fractional distillation. The 2-(2'-carbobutoxyethyl)-5-amino-5-ethyl-2-methyl - 1,3 - dioxane thus obtained boiled at 160° C. (3 mm.) and was obtained in a yield of 79% of theory.

Analysis: Calculated for $C_{14}H_{27}NO_4$: N, 5.17. Found: N, 5.18.

*Example II*

2-(2'-carbethoxyethyl)-5-amino-5-ethyl-2-methyl-1,3-dioxane) was prepared in accordance with the conditions described in Example I from 2-(2'-carbethoxyethyl)-5-nitro-5-ethyl-2-methyl-1,3-dioxane in a yield of 92.2%. The product was found to possess a neutral equivalent of 250 as compared to 245 for theory.

The substituted 5-amino-1,3-dioxanes of the present invention are in general colorless liquids or white crystalline solids and have been found to be soluble in the customary organic solvents, such as methanol, acetone, ether, and benzene. They are, in general, stable compounds, some of which are capable of withstanding temperatures as high as 200° C. with only slight decomposition. The substituted 5-amino-1,3-dioxanes of my invention have been found to be useful in the synthesis of numerous valuable organic compounds. Other uses of these materials will be apparent to those skilled in the art.

My invention now having been described, what I claim is:

1. Substituted 5-amino-1,3-dioxanes having the structural formula:

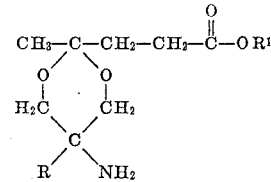

in which R is a member selected from the group consisting of hydrogen and alkyl, and $R^1$ is alkyl.

2. 2-(2'-carbobutoxyethyl)-5-amino-5-ethyl-2-methyl-1,3-dioxane.

3. 2-(2'-carbethoxyethyl)-5-amino-5-ethyl-2-methyl-1,3-dioxane.

GLEN H. MOREY.